US006822356B2

(12) United States Patent
Suzuki et al.

(10) Patent No.: US 6,822,356 B2
(45) Date of Patent: Nov. 23, 2004

(54) ELECTRIC ROTARY MACHINE WITH STATOR ARMATURE INCLUDING BARRIER WALLS

(75) Inventors: Yuzuru Suzuki, Shizuoka-ken (JP); Seiichi Matsuura, Shizuoka-ken (JP); Kunitake Matsushita, Shizuoka-ken (JP); Kazuo Muramatsu, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/371,533

(22) Filed: Feb. 21, 2003

(65) Prior Publication Data

US 2003/0160523 A1 Aug. 28, 2003

(30) Foreign Application Priority Data

Feb. 27, 2002 (JP) ........................................ 2002-051006

(51) Int. Cl.$^7$ .............................................. H02K 11/00
(52) U.S. Cl. ............................................. 310/71; 310/43
(58) Field of Search ........................... 310/71, 43, 254; H02K 5/08

(56) References Cited

U.S. PATENT DOCUMENTS 6,166,468 A * 12/2000 Suzuki et al. ................. 310/90
6,177,751 B1    1/2001 Suzuki et al. ................. 310/269
6,411,006 B2 *  6/2002 Suzuki et al. ................. 310/254

FOREIGN PATENT DOCUMENTS

| JP | 58148646    |   | 9/1983 | .......... H02K/15/12 |
| JP | 05207711    |   | 8/1993 | .......... H02K/15/12 |
| JP | 06178484    |   | 6/1994 | ............ H02K/5/08 |
| JP | 406178483 A | * | 6/1994 | ............ H02K/5/08 |
| JP | 2001-238377 |   | 8/2001 | ............ H02K/1/18 |

* cited by examiner

Primary Examiner—Dang Le
Assistant Examiner—Nguyen Hanh
(74) Attorney, Agent, or Firm—Fay, Sharpe, Fagan, Minnich & McKee, LLP

(57) ABSTRACT

An electric rotary machine includes a stator armature which comprises: a stator ring; a plurality of discrete salient poles each including a pole tooth and a coil, disposed inside the stator ring thereby forming a magnetic circuit, and fixed by a molding resin injected inside the stator ring from an injection port of a molding die; and a plurality of barrier walls. Each of the barrier walls is disposed between the injection port of the molding die and two coil terminal pins to which the coil has its both wire terminations connected respectively.

10 Claims, 6 Drawing Sheets

INJECTION POINT OF MOLDING DIE

FIG.3A FIG.3B
FIG.4
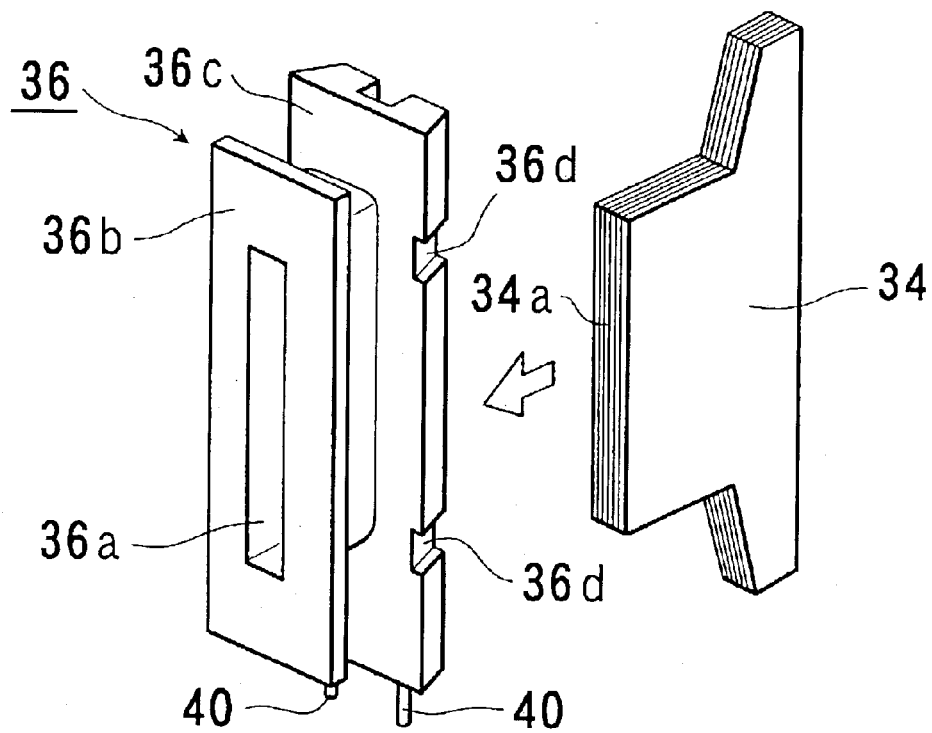
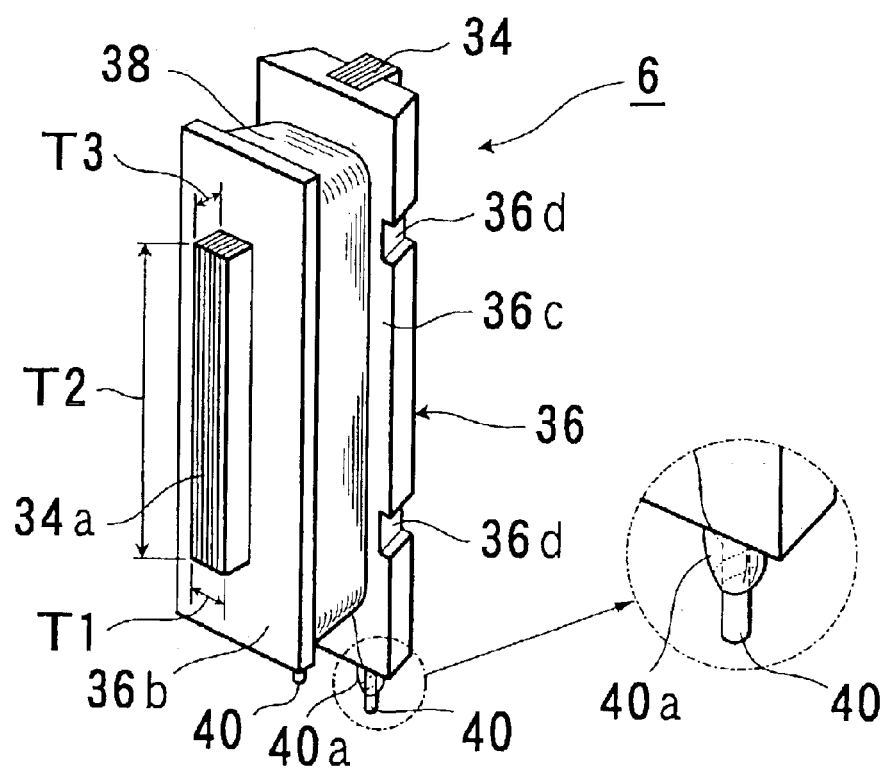

INJECTION POINT OF MOLDING DIE

ELECTRIC ROTARY MACHINE WITH STATOR ARMATURE INCLUDING BARRIER WALLS

BACKGROUND OF THE INVENTION

1. Field of the Invention

The present invention relates to an electric rotary machine (hereinafter referred to as "rotary machine," or occasionally "motor" as appropriate), and more particularly to a radial gap type rotary machine comprising a stator armature with discrete salient poles.

2. Description of the Related Art

In a conventional rotary machine including a stator armature (hereinafter referred to as "armature" as appropriate) structured such that a plurality of ring-shaped yoke pieces, which are made of a soft magnetic plate, such as a silicon steel plate, and which each have a plurality of pole tooth portions protruding radially, are stacked in the axial direction, since each of the ring-shaped yoke pieces is punched out integrally with the plurality of pole tooth portions as a single piece (the armature composed of the ring-shaped yoke pieces thus structured is hereinafter referred to as "integral armature" as appropriate), pole teeth each composed of a stack number of pole tooth portions are not partitioned structurally and therefore a resultant armature will have superior magnetic efficiency (low reluctance). However, in a small rotary machine, since a wire is usually wound directly on each of the pole teeth, the integral armature makes the winding operation troublesome, and makes it extremely troublesome when the rotary machine is of inner rotor type. As a result, the winding operation takes a long time, and the winding incurs unsatisfactory space factor as well. And, due to the flyer-winding involved in this case, the wire is subject to torsional stress during the winding operation, thereby failing to ensure reliability of the winding area.

Under the circumstances above described, a rare earth magnet having high energy product has been developed recently, and the structure of a rotary machine can be reviewed by means of magnetic circuit analysis using a computer. This works to enable a rotary machine with an armature of discrete salient pole structure (this armature is hereinafter referred to as "discrete armature" as appropriate) to obtain requisite motor characteristics. The rotary machine with the discrete armature may give some undesired increase in reluctance but offers great advantages of easier winding operation and increased space factor of winding, which outweigh the disadvantageous increase in reluctance. From this, it is now realized that the rotary machine with the discrete armature produces higher performance and is manufactured less expensively on the whole, and there is a growing demand for the discrete armature.

One example of the discrete armature is manufactured such that pole tooth portions are dismembered off its main body portion of an integral armature, a wire is wound around each of the dismembered pole tooth portions thereby constituting each salient pole portion, and that the pole tooth portions each with a wire wound therearound (namely, the salient pole portions) are rejoined to the main body portion by laser-welding, or the like.

The armature thus structured and manufactured, however, has a disadvantage that the integral armature has to be first sectioned into the main body portion and the pole tooth portions and later the sectioned portions have to be put back together, thereby requiring an additional time. Also, when the pole tooth portions each with a winding (salient poles) are rejoined to the main body portion, the stack layers of the both portions have to be matched with each other, and therefore it is required that respective portions be held together by a well-maintained tool and surely welded plate by plate for ensuring precision, which results in decreased workability. And, joints (welded portions) deteriorate significantly in mechanical strength and magnetic characteristics.

To overcome the above described problems, the present inventors disclosed in Japanese Patent Application Laid-open No. 2001-238377 a radial gap type rotary machine, in which a stator armature comprises: a plurality of discrete salient poles; a cylindrical pole tooth ring for positioning and magnetically and mechanically connecting the salient poles to one another; and a cylindrical stator ring adapted to house the salient poles and to decrease leakage flux resulting from magnetic discontinuity.

In the above described rotary machine, a molding resin is injected inside the stator ring, which can fix integrally the components constituting the armature, and at the same time can form a cylindrical space for housing a rotor with an accuracy as high as corresponding to that of an injection molding die employed.

The rotary machine, however, has a problem in that the molding resin, when injected, can harm connections between stator coil wire terminations and coil terminal pins, and also damage solder applied to the connections such that when the molding resin melted is injected inside the stator ring, the solder is melted due to the heat (about 200 degrees Centigrade) and flow of the resin, whereby problems such as a loose contact are caused, and in an extreme case the wires are broken or the melted solder flows to the salient poles or other electrodes resulting in electrical troubles.

SUMMARY OF THE INVENTION

The present invention has been made in view of the above problem, and it is an object of the invention to provide a rotary machine, in which a stator armature is structured such that the connections of the coil wire terminations with the coil terminal pins, and the solders applied to the connections are kept free from harm or damage when the molding resin is injected into the stator ring.

In order to achieve the above object, according to a first aspect of the present invention, a rotary machine includes a stator armature which comprises: a stator ring; a plurality of discrete salient poles each including a pole tooth and a coil, disposed inside the stator ring, and fixed by a molding resin injected inside the stator ring from an injection port of a molding die; and a plurality of barrier walls. Each of the barrier walls is disposed between the injection port of the molding die and two coil terminal pins to which the coil has its both wire terminations connected respectively.

According to a second aspect of the present invention, in the rotary machine of the first aspect, the both wire terminations of the coil are soldered to the two coil terminal pins.

According to a third aspect of the present invention, in the rotary machine of the first or second aspect, the barrier walls are provided on a terminal holder including a plurality of holes adapted to have the terminal pins inserted thereinto.

According to a fourth aspect of the present invention, in the rotary machine of the third aspect, the terminal holder is formed of resin.

Thus, in the rotary machine of the present invention, the barrier walls are each positioned between the injection port of the molding die and the connections of the coil wire terminations with the two coil terminal pins, and the solders applied to the connections, whereby the barrier walls prevent the injected molding resin from running directly against the connections and the solders. Accordingly, the connections and the solders do not directly receive physical and thermal impact of the molding resin flowing in, whereby the resin can be injected inside the stator ring without detriment to the connections and the solders.

BRIEF DESCRIPTION OF THE DRAWINGS

FIGS. 3A and 3B in combination constitute an exploded perspective view of a salient pole (omitting a coil) shown in FIGS. 1 and 2, respectively showing a bobbin and a pole tooth;

FIG. 4 is a perspective view, with a part enlarged, of the salient pole (including the coil) shown in FIGS. 1 and 2;

FIGS. 5A to 5C in combination constitute an exploded perspective view of an armature assembly shown in FIG. 1, wherein FIG. 5A shows six discrete salient poles extending radially and arrayed circumferentially at a regular angular interval of 60 degrees with respective bobbin inward flanges in contact with one another, FIG. 5B shows a tooth pole ring, and FIG. 5C shows a stator ring;

DETAILED DESCRIPTION OF THE PREFERRED EMBOPDIMENTS

Preferred embodiments of the present invention will be described with reference to the drawings.

Figure 1:
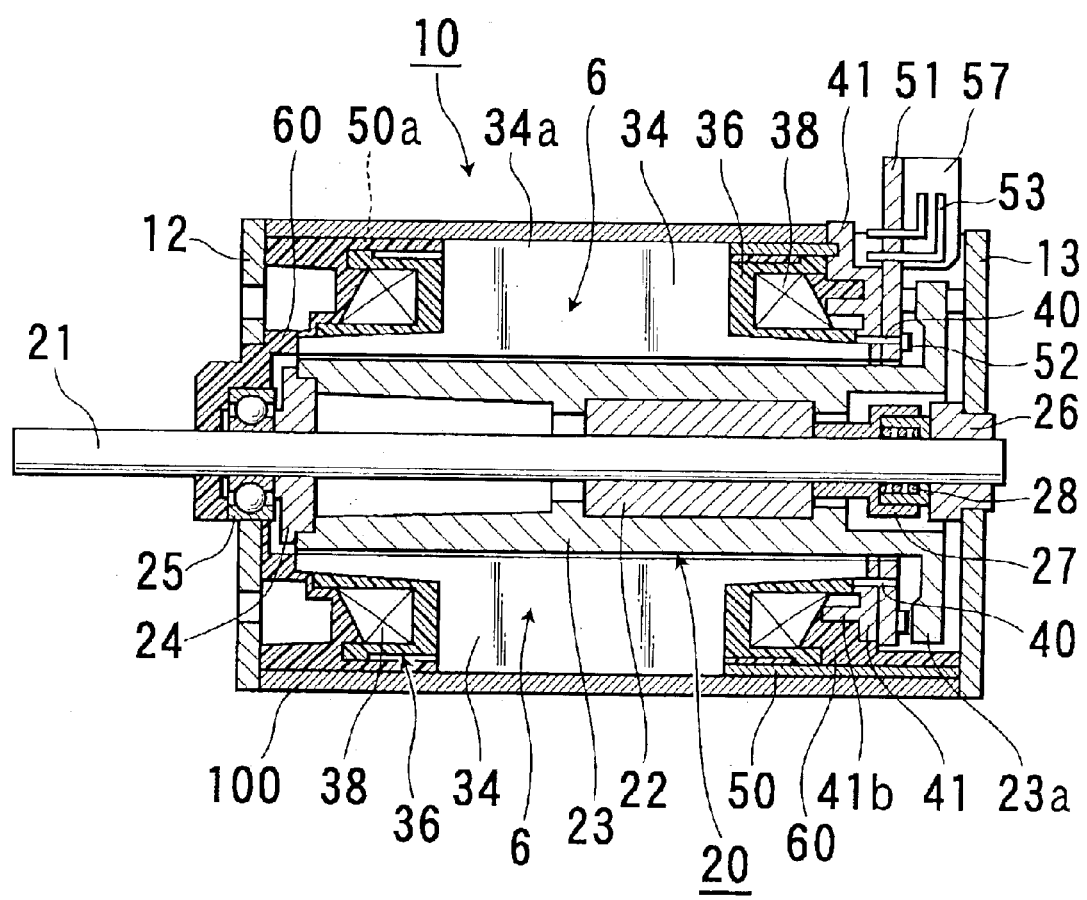
FIG. 1 is an axial section view of a rotary machine according to a first embodiment of the present invention.
Figure 2:
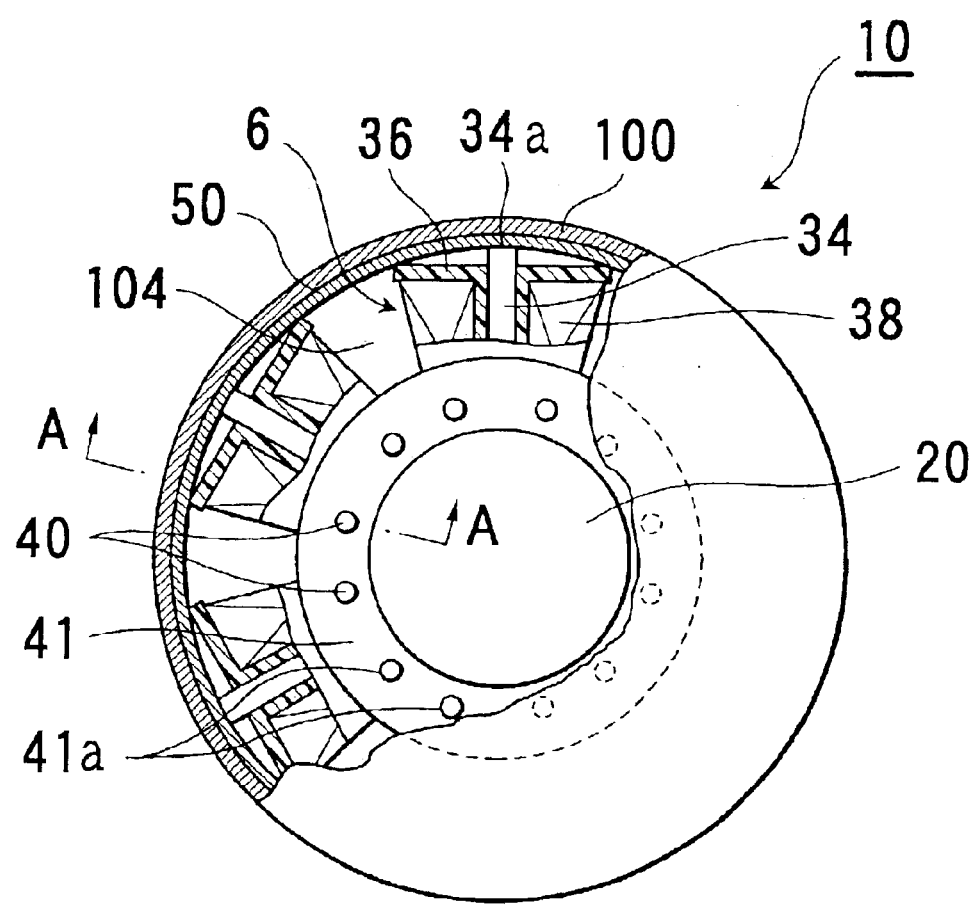
FIG. 2 is a partial radial section view of FIG. 1.

Referring to FIGS. 1 and 2, illustrated are: salient poles 6, an armature assembly 10, flanges 12 and 13, a rotor assembly 20, a shaft 21, a sleeve 22, a rotor field magnet 23, a rotor position detecting magnet 23a, a spacer 24, a ball bearing 25, a sleeve bearing 26, a preload spring holder 27, a preload spring 28, pole teeth 34, pole tooth end portions 34a, bobbins 36, magnet wires 38, coil terminal pins 40, a terminal holder 41, terminal holder holes 41a, terminal holder barrier walls 41b, a pole tooth ring 50, pole tooth ring slits 50a, a printed circuit board 51, a Hall sensor 52, connector terminals 53, a positioning ring 55, a connector 57, a molding resin 60, a molding resin injection space 60a, and a stator ring 100.

The embodiments described herein refer to a three-phase inner rotor type brushless DC motor with six salient poles and eight magnetic poles on the rotor, and FIGS. 1 and 2 show a so-called integrally resin-molded armature assembly structured such that a resin is filled inside an armature assembly except a portion where a rotor field magnet is received.

The brushless DC motor generally comprises: the armature assembly 10; the two flanges 12 and 13 arranged respectively at both axial ends of the armature assembly 10; and the rotor assembly 20 rotatably disposed inside the armature assembly 10.

The armature assembly 10 includes: the stator ring 100 as its outer circumference; and six of the salient poles 6 each extending radially, and arrayed circumferentially at an even angular interval of 60 degrees.

The salient poles 6 will be described below with reference to FIGS. 3A, 3B and 4. In FIGS. 3A, 3B and 4, the constituting parts same as or corresponding to those shown in FIGS. 1 and 2 have the same reference numbers.

The salient poles 6 are each structured such that the pole tooth 34 (FIG. 3B) composed of seven surface-insulated magnetic steel plates stacked on one another, each plate having a thickness of 0.5 mm and punched out to be substantially T-shaped, has its T-letter's vertical (oriented horizontal in the figure) bar portion inserted into a rectangular hole 36a of the resin bobbin 36 (FIG. 3A), and such that the magnet wire 38 is wound on the bobbin 36 between the bobbin flanges 36b and 36c as shown in FIG. 4. The substantially T-shaped pole tooth 34 has a thickness T1, and the vertical bar portion thereof has a width T2 and has a length so as to protrude by a dimension T3 overall from the surface of the bobbin flange 36b when fitted into the hole 36a of the bobbin 36.

The pole tooth 34 may alternatively be made of a soft magnetic material such as a ceramic molding formed by sintering a soft magnetic powder, and a metallurgic molding formed by sintering a soft magnetic material composed of micro-powder of surface-insulated pure iron. The pole tooth 34 made of a different soft magnetic steel material containing Fe—Ni—Cr series steel not only keeps a high permeability but also has a relatively high electrical resistance thereby reducing its eddy current loss, and at the same time is free from corrosion without rustproof treatment, thus being rendered suitable for use in extreme environments such as automotive application.

The bobbin flange 36c has, on each of its both sides, two notches 36d, 36d forming resin injection holes 37 (to be further described later: see upcoming FIG. 5A) for injecting the molding resin 60 through.

The terminations of the magnet wire 38 are bound around the coil terminal pins 40 and soldered thereto as shown in FIG. 4 (see a soldered portion 40a in the enlarged view encircled).

The armature assembly 10 will be described with reference to FIGS. 5A to 5C, where the constituting parts same as or corresponding to those shown in FIGS. 1 to 4 have the same reference numbers.

Figure 5A:
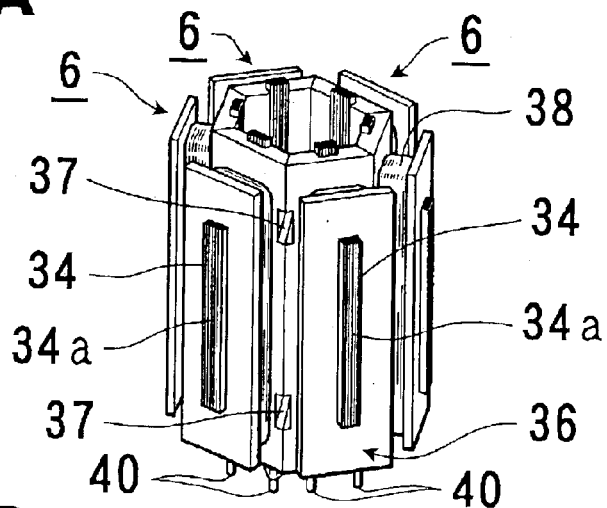

Referring to FIG. 5A, two of the aforementioned resin injection holes 37 are formed at every interface between two adjacent bobbin flanges 36c, 36c (see FIGS. 3A and 4) laterally butting each other, such that two notches 36d, 36d (see FIGS. 3A and 4) formed on the butting surface of one bobbin flange 36c of the two oppose respectively two notches 36d, 36d formed on the butting surface of the other bobbin flange 36c of the two.

Figure 5B:
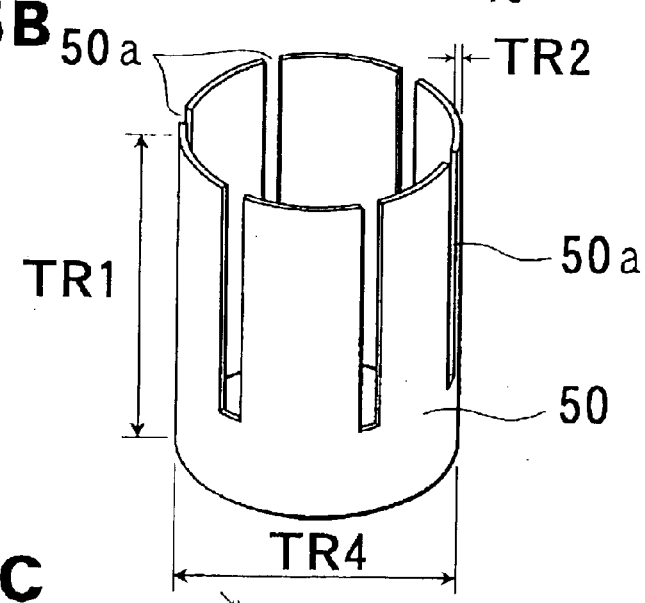

Referring to FIG. 5B, the pole tooth ring 50 is a hollow cylinder of a soft magnetic steel plate, and has six slits 50a adapted to respectively receive the end portions 34a of the pole teeth 34 of the salient poles 6 thereby positioning the salient poles 6.

Figure 5C:
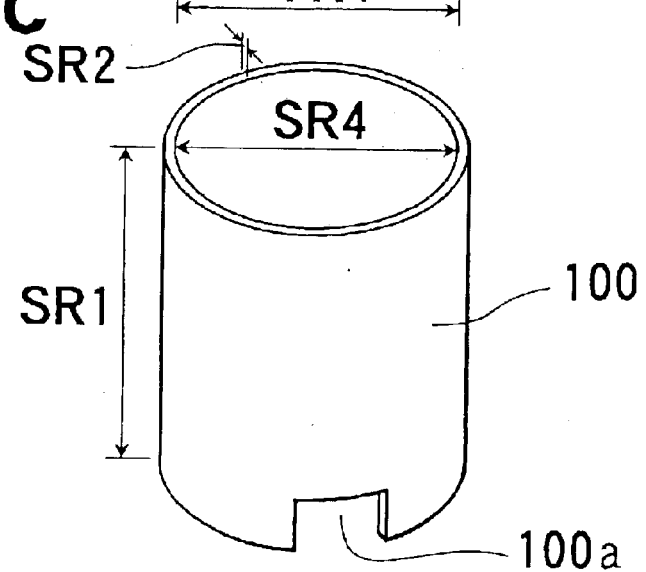

Referring to FIG. 5C, the stator ring 100 is a hollow cylinder of a soft magnetic steel plate, and houses the pole tooth ring 50 having the salient poles disposed therein, thereby forming a magnetic circuit. The stator ring 100, unlike the pole tooth ring 50, does not have any mechanisms such as slits 50a. The stator ring 100 has an inner diameter SR4 set to be equal to or slightly larger than an outer diameter of TR4 of the pole tooth ring 50 so that the pole tooth ring 50 can be tightly fitted into the stator ring 100. The stator ring 100 has an axial dimension SR1 set to be equal to or larger than an axial dimension TR1 of the pole tooth 50, so the pole tooth ring 50 is completely enclosed by the stator ring 100. Accordingly, the mechanisms, specifically slots 50a provided on the pole tooth ring including the pole teeth are not exposed and magnetic discontinuity is covered, thereby significantly reducing leakage flux. And the product appearance quality and decency is also enhanced. The stator ring 100 has a wall thickness SR2 set to be larger than a wall thickness TR2 of the pole tooth ring 50 because the flanges 12 and 13 must be welded thereto, but the wall thickness SR2 should be minimized insofar as the flanges 12 and 13 can be duly welded. The stator ring 100 is provided with a cutaway 100a for accommodating the connector 47 (see FIG. 1).

The terminal holder 41 will be described with reference to FIGS. 6A and 6B. The terminal holder 41 may be a flat circular ring formed of, for example, polybutylene terephthalate (PBT) resin, has a plurality of terminal holes 41a in a number corresponding to the total number of the coil terminal pins 40 (in this embodiment, twelve terminal holes are provided to correspond to six of the salient poles each having two coil terminal pins), and is provided with a plurality of barrier walls 41b in a number corresponding to the number of the salient poles (in this embodiment, six barrier walls are provided). The barrier walls 41b may be formed integrally with the flat circular ring using the same material as the flat circular ring, or may be formed separately using a different material and attached to the flat circular ring. The barrier walls 41b are preferably formed of an insulating material with a high melting point but may alternatively be formed of resin, which is also effective in preventing the molding resin from running directly against the coil terminal pins 40 and the soldered portions 40a.

In the terminal holder 41 thus structured, the coil terminal pins 40 are inserted through the terminal holes 41a thereby positioning the coil terminal pins 40, the molding resin is injected inside the stator ring 100, and the barrier walls 41b provided on the terminal holder 41 are adapted to protect the coil terminal pins 40 and the soldered portions 40a from the heat and pressure of the molding resin injected.

Figure 6A:
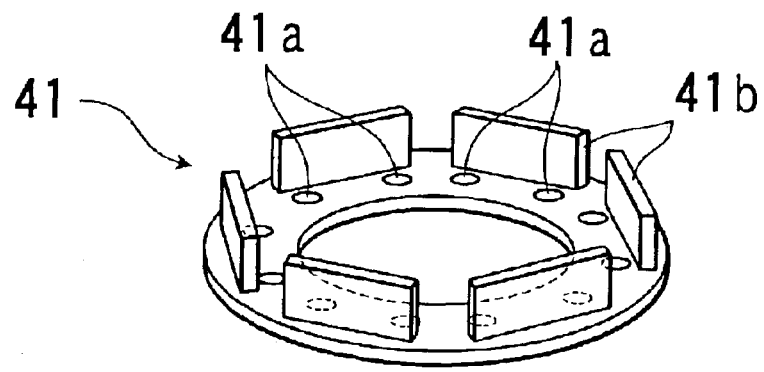
FIGS. 6A and 6B are respectively a perspective view and a top plan view of a terminal holder according to the first embodiment.
Figure 6B:
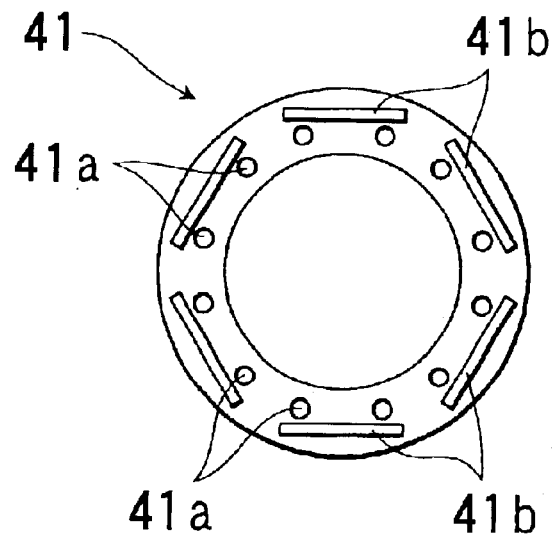
Figure 7:
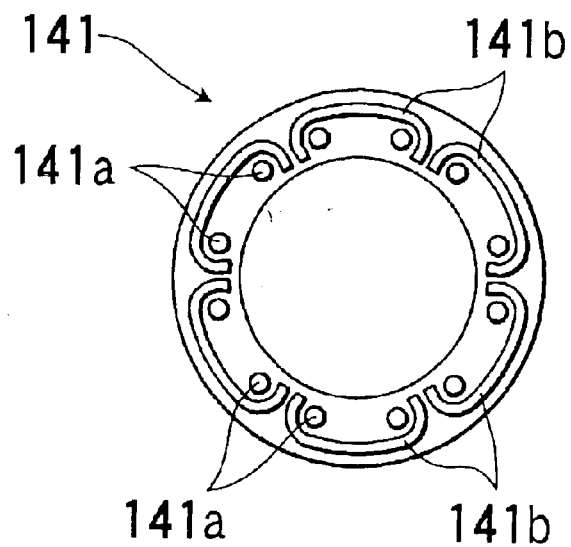
FIG. 7 is a top plan view of a terminal holder according to second embodiment.

In the embodiment described above, the barrier walls 41b are each configured to shape like a plain plate and to cover the area of two holes 40a as shown in FIGS. 6A and 6B, but are not limited to the configuration. Referring to FIG. 7, a terminal holder 141 is structured such that barrier walls 141b are each configured to be curved so as to enclose two holes 141a.

Figure 8:
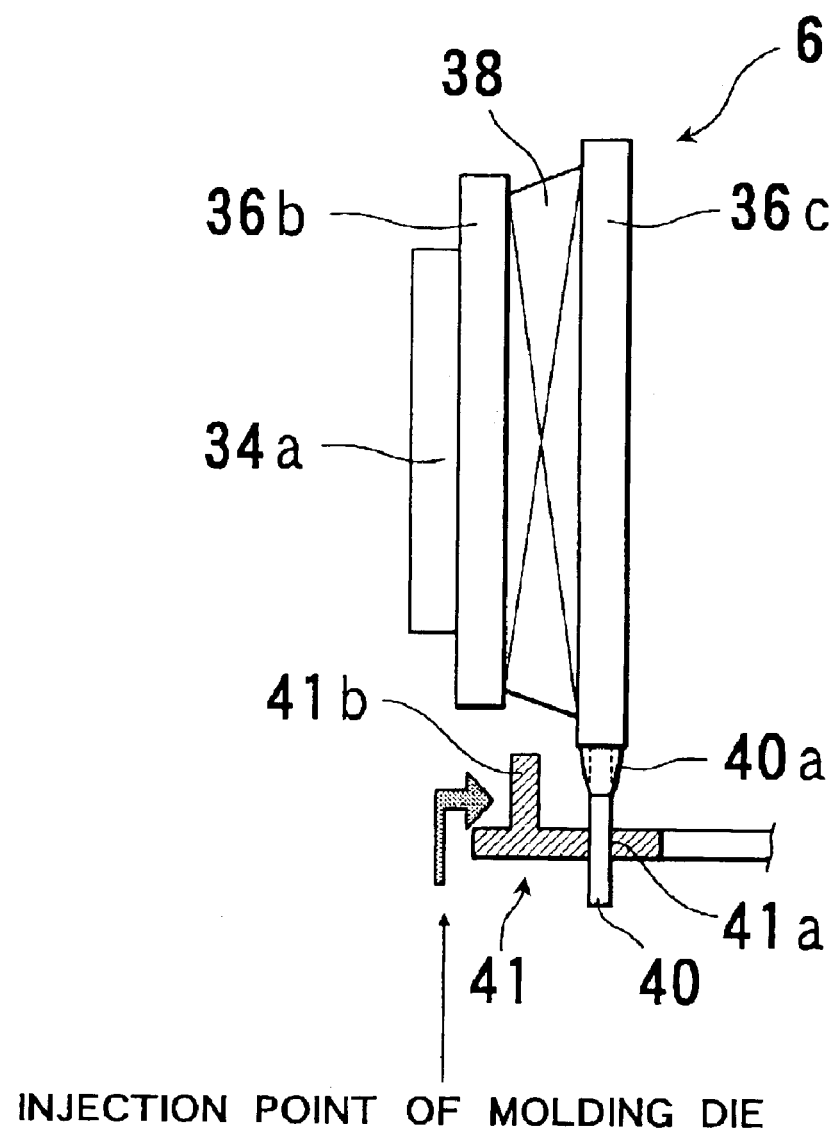
FIG. 8 is a cross-section view of the rotary machine of FIG. 2 taken along a line A—A.

Referring to FIG. 8, the molding resin 60 injected from the injection port of the molding die into the stator ring 100 takes a flow path indicated by the cranked thick arrow. As shown in the figure, the barrier wall 41b is positioned between the injection port of the molding die and the coil terminal pin 40 including the soldered portion 40a, so as to prevent the molding resin 60 from running directly against the coil terminal pin 40 and the soldered portion 40a.

The preceding description has been presented only to illustrate and describe the invention. It is not intended to be exhaustive or to limit the invention to any precise form disclosed Many modifications and variations are possible in light of the above teaching. The preferred embodiment was chosen and described in order to best explain the principles of the invention and its practical application so as to enable others skilled in the art to best utilize the invention in various embodiments and with various modifications as are suited to the particular use contemplated. It is intended that the scope of the invention be defined by the following claims.

What is claimed is:

1. An electric rotary machine, in which a stator armature comprises:
   a stator ring;
   a plurality of discrete salient poles each including a pole tooth and a coil, disposed inside the stator ring, and fixed by a molding resin injected inside the stator ring from an injection port of a molding die, the coil including wire terminations, each wire termination being connected to a respective coil terminal pin;
   a terminal holder for positioning the coil terminal pins; and
   a plurality of barrier walls provided on the terminal holder, the barrier walls each being provided between the injection port of the molding die and the coil terminal pins.

2. An electric rotary machine according to claim 1, wherein the respective wire terminations of the coil are connected to the coil terminal pins by soldering.

3. An electric rotary machine according to claim 1, wherein the terminal holder includes a plurality of holes adapted to have the terminal pins inserted thereinto.

4. An electric rotary machine according to claim 1, wherein the terminal holder is formed of resin.

5. An electric rotary machine, in which a stator armature comprises:
   a stator ring;
   a plurality of discrete salient poles each including a pole tooth and a coil, disposed inside the stator ring, and fixed by a molding resin injected inside the stator ring from an injection port of a molding die; and
   a plurality of barrier walls, the barrier walls each being provided between the injection port of the molding die and two coil terminal pins to each of which the coil has a respective wire termination connected, wherein the respective wire terminations of the coil are connected to the two coil terminal pins by soldering, and wherein the barrier walls are provided on a terminal holder including a plurality of holes adapted to have the terminal pins inserted thereinto.

6. An electric rotary machine according to claim 1, wherein the barrier walls are formed integrally with the terminal holder.

7. An electric rotary machine according to claim 1, wherein the terminal holder and the barrier walls are formed of the same material.

8. An electric rotary machine according to claim 1, wherein the barrier walls are configured in the shape of a plain plate.

9. An electric rotary machine according to claim 1, wherein the barrier walls are configured in a curved shape so as to enclose the coil terminal pins.

10. An electric rotary machine according to claim 4, wherein the resin comprises polybutylene terephthalate (PBT).

* * * * *